United States Patent [19]

Osumi et al.

[11] 4,396,576

[45] Aug. 2, 1983

[54] ALLOY FOR OCCLUSION OF HYDROGEN

[75] Inventors: Yasuaki Osumi, Minoo; Hiroshi Suzuki, Ikeda; Akihiko Kato, Matsubara; Keisuke Oguro, Ikeda; Masanori Nakane, Ibaraki, all of Japan

[73] Assignees: Agency of Industrial Science & Technology; Ministry of International Trade & Industry, both of Tokyo, Japan

[21] Appl. No.: 276,833

[22] Filed: Jun. 24, 1981

[30] Foreign Application Priority Data

Jul. 4, 1980 [JP] Japan ................................. 55-91944

[51] Int. Cl.$^3$ ............................................. C22C 19/03

[52] U.S. Cl. .................................... 420/455; 420/580; 420/581; 420/582; 420/587; 420/900

[58] Field of Search ..................... 75/122, 134 F, 170

[56] References Cited

U.S. PATENT DOCUMENTS 4,222,770 9/1980 Osumi et al. ......................... 75/122

Primary Examiner—R. Dean
Attorney, Agent, or Firm—Kurt Kelman

[57] ABSTRACT

An alloy having a composition of the general formula, $MmNi_{5-x}A_{x-y}B_y$, wherein Mm is misch metal, A is one member selected from the group consisting of Al, Cu, and Mn and B is one member selected from the group consisting of Al, Co, Cu, Fe, Mn, and Si, providing that both A and B do not represent one same compound, is useful for the occlusion of hydrogen.

3 Claims, No Drawings

ALLOY FOR OCCLUSION OF HYDROGEN

BACKGROUND OF THE INVENTION

This invention relates to a novel misch metal-nickel type multi-component alloy useful for the occlusion of hydrogen, which alloy is capable of occluding a large amount of hydrogen in the form of hydride and, upon slight heating, readily and quickly releasing the occluded hydrogen.

Since hydrogen in an inexhaustible, clean substance easy to transport and store, it is attracting increasing attention as a new energy source to take the place of fossil fuels.

Hydrogen has long been stored either in a gaseous form or in a liquefied form. Since the development of a method capable of storing hydrogen in the form of hydride as occluded in a metal, various substances useful for such occlusive storage of hydrogen have been perfected.

The conditions which a hydrogen-occluding substance is required to meet are that the substance is inexpensive and abundant in supply, that it is easily activated and has a high capacity for the occlusion of hydrogen, that it possesses a proper dissociation equilibrium pressure near room temperature, that it only requires a low hydrogen pressure to permit its conversion to hydride, that it occludes and releases hydrogen reversibly at a high speed.

The transition metals such as Ti, Zr, La, and Mg have been known to form hydrides. These metals in the form of hydrides exhibit extremely high thermal stability; they do not release hydrogen until their temperature is elevated to high levels exceeding 300° C. As substances for the occlusion of hydrogen, therefore, these metals have very poor practicability. In recent years, various alloys such as Ti-Ni, Ti-Co, Ti-Fe, La-Ni, Mg-Ni, Mm (misch metal)-Ni, and Mm-Co alloys have been developed. They invariably have numerous disadvantages which stand in the way of their actual adoption as substances for the occlusion of hydrogen. Of the various alloys enumerated above, those including Ti, La, and Mg are thermally as stable as the aforementioned single metals of Ti, La, and Mg or they occlude and release hydrogen at a very slow speed and do not permit easy activation. The metals which go to make up these alloys are required to possess very high levels of purity and, accordingly, pose a difficult economic problem. With these alloys, since their capacities for the occlusion of hydrogen are delicately affected by the purity of hydrogen to be occluded, the hydrogen given to be occluded is inevitably limited by the requirement that it must possess a high purity.

In the Ti-Fe alloy, for example, substantially no occlusion of hydrogen occurs under application of a hydrogen pressure of 50 kg/cm² at room temperature, nor is it possible activate the alloy under these conditions. For this alloy to effect occlusion of hydrogen, its temperature must be elevated to a high level in the range of from 400° C. to 500° C. and the activation of the alloy requires the operation of occlusion to be repeated several times.

Comparison of the Mm-Ni alloy and the Mm-Co alloy reveals that the former has a high capacity for occlusion of hydrogen but involves a high dissociation equilibrium pressure and the latter has a low dissociation equilibrium pressure but suffers from a small capacity for occlusion of hydrogen. Further, the Mm-Ni alloy has a disadvantage that its activation requires a high hydrogen pressure of the order of 80 to 90 kg/cm², consumes much time or necessitates a number of activation treatments and, at the same time, the occlusion and release of hydrogen takes much time.

Many inventions have been perfected to provide improved alloys such as $Mm_{1-x}Ca_xNi_5$ alloy (U.S. Pat. No. 4,096,639), $MmNi_{5-x}Co_x$ alloy (U.S. Pat. No. 4,147,536), $MmNi_{5-x}A_x$ alloy (U.S. Pat. No. 4,222,770), $MmNi_{5-x}Cr_{x-y}A_y$ alloy (U.S. Ser. No. 192,809, dated Oct. 1, 1980), and $Mm_{1-x}Ca_xNi_{5-y}A_y$ alloy (U.S. Ser. No. 222,351, dated Jan. 5, 1981). These alloys are noted to possess gradually improved properties as hydrogen-occlusion alloys. The $Mm_{1-x}Ca_xNi_5$ alloy enjoys a low cost of production but suffers from a high dissociation equilibrium pressure. The $MmNi_{5-x}Co_x$ alloy is characterized by approximating the Mm-Co alloy in dissociation equilibrium pressure and the Mm-Ni alloy in capacity for the occlusion of hydrogen. The $MmNi_{5-x}A_x$ alloy is improved in the properties such as the speed of hydrogen occlusion, the activation and the dissociation equilibrium pressure which are important for hydrogen occlusion alloys. The $MmNi_{5-x}Cr_{x-y}A_y$ alloy exhibits a constant dissociation pressure over a wide range of hydrogen/metal atomic ratio, i.e. it possesses a small flatness factor. The $Mm_{1-x}Ca_xNi_{5-y}A_y$ alloy is characterized by its low cost. With these alloys, however, the pressures for activation and those for hydrogen occlusion are invariably on the order of 50 kg/cm². For practical purposes, all these alloys are required to be further improved in their respective properties. Particularly, their pressures for activation and their pressures for hydrogen occlusion are desired to be lowered. No matter how excellent the property of a given alloy may be with respect to the occlusion and release of hydrogen, the alloy has absolutely no practicability when it requires some tens of atmospheres of hydrogen pressure for the activation of the alloy itself and for the occlusion of hydrogen. The container for enclosing the alloy itself, therefore, cannot be given a very simple construction.

An object of this invention is to provide an alloy for the occlusion of hydrogen, which combines all the properties necessary for the occlusion of hydrogen and, at the same time, permits the activation of the alloy and the occlusion of hydrogen to be effectively performed at low hydrogen pressures.

SUMMARY OF THE INVENTION

To accomplish the object described above according to this invention, there is provided an alloy which is obtained on the basic principle that a prescribed amount of the nickel in the $MmNi_5$ alloy is displaced with specific metals. This alloy is represented by the following general formula:

$$MmNi_{5-x}A_{x-y}B_y$$

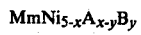

wherein, Mm stands for misch metal, A for one element selected from the group consisting of Al, Cu, and Mn, B for one element selected from the group consisting of Al, Co, Cu, Fe, Mn, and Si, x for a numerical value in the range of from 0.1 to 2, y for a numerical value in the range of from 0.01 to 1.99, providing that both A and B do not represent one same element and the numerical value of x is greater than that of y.

DESCRIPTION OF THE PREFERRED EMBODIMENT

The alloy of this invention has a composition represented by the general formula, $MmNi_{5-x}A_{x-y}B_y$, as described above. When the numerical value of x is smaller than 0.1, however, the alloy only exhibits properties approximating the properties of the alloy $MmNi_5$ and fails to manifest the effect of the incorporation of the metals A, B. Such an alloy entails a high dissociation pressure. The activation of this alloy, therefore, requires thorough degasification plus subsequent application of a high hydrogen pressure or retention of the alloy in an atmosphere of hydrogen at a low temperature, or both.

As the numerical value of x increases beyond 2, the release of the occluded hydrogen becomes difficult. Thus, there ensues a problem that the release of the occluded hydrogen must be encouraged by the elevation of the alloy temperature to a high level, at times, in conjunction with the vacuumization of the ambient of the alloy.

Preferably, the numerical value of x is within the range of from 0.5 to 1.0 and that of y within the range of from 0.1 to 0.9, and A is one member selected from the group of Al and Mn and B one member selected from the group of Al, Co, Fe, and Mn.

When the alloy has a composition which satisfies all these preferred conditions, it enjoys a great advantage that the pressure for the activation of the alloy and the hydrogen pressure for the occlusion of hydrogen are particularly low. For such an alloy, the maximum hydrogen pressure required for the hydrogen occlusion is 7 $kg/cm^2$ and the speeds of hydrogen occlusion and hydrogen release are relatively high. For the alloy to provide effective occlusion of hydrogen, these are outstanding characteristics.

The misch metal which is adopted for this invention is generally composed of 25 to 35% (by weight; applicable invariably hereinafter) of lanthanum, 40 to 50% of cerium, 1 to 15% of praseodymium, 4 to 15% of neodymium, 1 to 7% of samarium+gadolinium, 0.1 to 5% of iron, 0.1 to 1% of silicon, 0.1 to 2% of magnesium, 0.1 to 1% of aluminum, etc. It is marketed as misch metal by several companies.

Manufacture of the multi-component alloy of this invention represented by the aforementioned general formula can be carried out by any of the various methods known to the art. Among other methods, the arc melting method proves particularly advantageous. To be specific, the alloy is manufactured by mixing misch metal, nickel, and the components A and B available in a powdered form or in some other suitable molded form (usually of bars) in respective amounts proportionate to the composition of the general formula, compression molding the resultant mixture in a desired shape, then placing the moled mixture in an arc melting furnace of known construction, thermally fusing it in an atmosphere of inert gas and then allowing the fused mixture to cool off. Generally in order for the multi-component alloy of this invention obtained as described above to possess a greater surface area and fulfill its function more effectively, it is used advantageously in a powdered form.

The alloy described above can be activated very easily and, after the activation, can occlude and release a large amount of hydrogen easily and quickly. The activation is effected by vacuumizing the ambience of the alloy with a rotary pump, degasifying the alloy under application of heat at 80° C., and subsequently subjecting the degased alloy to just one cycle of hydrogen occlusion and release.

This occlusion of hydrogen in the alloy or the formation of hydride in the alloy is accomplished by filling a suitable container with the powdered alloy mentioned above, degasing the packed alloy in the container, then introducing hydrogen into the alloy at room temperature, and applying thereto a hydrogen pressure of not more than 10 $kg/cm^2$.

As described above, the hydrogen pressure required for the occlusion of hydrogen in the alloy of this invention is as low as 10 $kg/cm^2$ or less. Moreover, this alloy enjoys a major advantage that the occlusion of hydrogen can be completed in a very short period of several minutes at room temperature.

After the aforementioned operation of hydrogen occlusion is completed, the system is evacuated. Thus, the occluded hydrogen is readily released, completing the activation of the alloy.

Now, occlusion of hydrogen into the alloy which has been activated as described above is accomplished by placing this alloy in a container such as an ordinary cylinder which is capable of sealing this alloy and applying thereto hydrogen pressure of not more than 9 $kg/cm^2$, usually 7 $kg/cm^2$, at room temperature. Consequently, the alloy occludes a large amount of hydrogen in the form of hydride in a short period of time. Release of hydrogen from this hydride may be accomplished by merely opening the container at room temperature. For quick and efficient release of hydrogen, elevation of the alloy temperature to a level normally higher than the room temperature or vacuumization of the ambience of the alloy or both may be required.

In contrast to the conventional alloy which has required application of pressure to the extent of 50 $kg/cm^2$ for the occlusion of hydrogen, the alloy of this invention which has been activated as described above effects the occlusion of hydrogen at room temperature under atmospheric pressure.

Moreover, this alloy occludes hydrogen at a speed favorably comparable with the speed at which the conventional alloy has occluded hydrogen under application of pressure. This fact constitutes another salient characteristic of the alloy of this invention. The alloy also enjoys a low dissociation equilibrium pressure.

Further, the alloy of this invention effects the aforementioned occlusion and release of hydrogen in a perfectly reversible manner. No matter how often the formation and decomposition of the hydride in the alloy may be repeated, substantially no degradation occurs in the alloy itself. This means that the alloy can be used for a long time. Impurities such as oxygen, nitrogen, argon, carbon dioxide, etc. which may possibly be contained in the occluded gas are observed to produce substantially no adverse effect upon the alloy. As described above, the alloy of this invention can be made to receive for storage a large amount of hydrogen by a simple operation using a hydrogen pressure very low by the standard of the conventional alloy. It can release the occluded hydrogen easily and quickly. Thus, this alloy proves highly useful for the occlusion of hydrogen.

The novel alloy provided by this invention for use in the occlusion of hydrogen combines all the properties indispensable to the occlusion of hydrogen as described above. The merits of this alloy are that the alloy is inexpensive, that the activation of the alloy is effected easily by application of a very low hydrogen pressure of not more than 10 kg/cm$^2$, that the alloy occludes a large amount of hydrogen to a high density, and that the alloy readily and quickly releases the occluded hydrogen at room temperature or under mild application of heat to a level slightly higher than room temperature.

The capacity of the alloy of the present invention for the occlusion of hydrogen is not affected at all by the purity of hydrogen being occluded. Thus, the alloy is capable of efficiently occluding hydrogen containing oxygen, nitrogen, argon, carbon dioxide, etc. in minute amounts. In addition, the alloy of this invention retains its properties intact through numerous repetitions of the cycle of hydrogen occlusion and release. Thus, it has an advantage that the initial capacity for hydrogen occlusion can be retained for a long time.

Now, the present invention will be described more specifically below with reference to working examples and comparative experiments.

EXAMPLE 1

Mm, Ni, and components A, B prepared in the shape of rods (5 mm in diameter and 5 mm in length) or in a powdered form were mixed in varying proportions, and the resulant mixtures were compression molded to produce cylindrical tablets. These tablets were placed in a steel crucible inside a high-vacuum arc melting furnace and, with the interior of the furnace displaced with an atmosphere of high-purity argon, fused with heat of about 2000° C. The fused mixture was allowed to cool off. Thus alloys of varying compositions shown in Table 1 were obtained. Each alloy thus produced was pulverized to 120 mesh. A 5.0 g portion of the powder was taken in a stainless steel reactor for occlusion and release of hydrogen and then subjected to activation as indicated below. The reactor was joined to an evacuation device, vacuumized, and heated to 80° C. to effect degasification.

Then, hydrogen of purity of 99.9999% was introduced at room temperature into the container which was held under a hydrogen pressure of not more than 10 kg/cm$^2$. Immediately, occlusion of hydrogen in the alloy was observed to proceed. After the occlusion of hydrogen in the alloy terminated, the container of the alloy was evacuated to complete the release of hydrogen from the alloy. This one cycle of hydrogen occlusion and release described above provided perfect activation of the alloy. At room temperature (20° C.), this alloy was made to occlude hydrogen of purity of 99.9999% under a hydrogen pressure of not more than 10 kg/cm$^2$. Thus, the hydrogen was occluded and sealed in the alloy.

The hydrogen occlusion-release properties of the alloy of this invention, such as the amount of hydrogen occluded, the pressure of hydrogen applied, the dissociation pressure exhibited by the formed hydride, the speed of hydrogen occlusion, and the speed of hydrogen release, which were determined in this case are shown in Table 1.

The application of hydrogen pressure and the occlusion of hydrogen were both carried out at room temperature (about 20° C.).

TABLE 1

| Run No. | Hydride of alloy | Amount of hydrogen occluded (% by weight) | Pressure of hydrogen during hydrogen occlusion (atm.) | Dissociation pressure of hydride at 20° C. (atm.) | Number of activation | Speed of hydrogen occlusion (ml/g.min) | Conditions of hydrogen release from hydride | | |
|---|---|---|---|---|---|---|---|---|---|
| | | | | | | | Speed of release (ml/g.min) | Temperature (°C.) | Pressure (atm.) |
| 1 | MmNi$_{4.9}$Al$_{0.09}$Co$_{0.01}$ | 1.5 | 9 | 8.0 | 1 | 160 | 240 | 20 | 1 |
| 2 | MmNi$_{4.5}$Al$_{0.25}$Co$_{0.25}$ | 1.6 | 7 | 2.0 | 1 | 165 | 250 | 20 | 1 |
| 3 | MmNi$_{4.0}$Al$_{0.5}$Co$_{0.5}$ | 1.6 | 7 | 2.0 | 1 | 165 | 250 | 20 | 1 |
| 4 | MmNi$_{3.0}$Al$_{0.01}$Co$_{1.99}$ | 1.5 | 7 | 4.5 | 1 | 160 | 245 | 20 | 1 |
| 5 | MmNi$_{4.9}$Al$_{0.09}$Cu$_{0.01}$ | 1.5 | 9 | 8.0 | 1 | 160 | 240 | 20 | 1 |
| 6 | MmNi$_{4.5}$Al$_{0.25}$Cu$_{0.25}$ | 1.6 | 7 | 1.5 | 1 | 165 | 240 | 20 | 1 |
| 7 | MmNi$_{4.0}$Al$_{0.5}$Cu$_{0.5}$ | 1.6 | 7 | 1.5 | 1 | 165 | 240 | 20 | 1 |
| 8 | MmNi$_{3.0}$Al$_{0.01}$Cu$_{1.99}$ | 1.5 | 7 | 5.0 | 1 | 160 | 230 | 20 | 1 |
| 9 | MmNi$_{4.9}$Al$_{0.09}$Fe$_{0.01}$ | 1.5 | 8 | 7.0 | 1 | 160 | 250 | 20 | 1 |
| 10 | MmNi$_{4.5}$Al$_{0.25}$Fe$_{0.25}$ | 1.6 | 7 | 1.5 | 1 | 165 | 260 | 20 | 1 |
| 11 | MmNi$_{4.0}$Al$_{0.5}$Fe$_{0.5}$ | 1.6 | 7 | 2.0 | 1 | 165 | 260 | 20 | 1 |
| 12 | MmNi$_{3.0}$Al$_{0.01}$Fe$_{1.99}$ | 1.5 | 7 | 1.5 | 1 | 165 | 260 | 20 | 1 |
| 13 | MmNi$_{4.9}$Al$_{0.09}$Mn$_{0.01}$ | 1.5 | 8 | 7.0 | 1 | 160 | 250 | 20 | 1 |
| 14 | MmNi$_{4.5}$Al$_{0.25}$Mn$_{0.25}$ | 1.6 | 7 | 1.7 | 1 | 165 | 260 | 20 | 1 |
| 15 | MmNi$_{4.0}$Al$_{0.5}$Mn$_{0.5}$ | 1.6 | 7 | 1.5 | 1 | 165 | 260 | 20 | 1 |
| 16 | MmNi$_{3.0}$Al$_{0.01}$Mn$_{1.99}$ | 1.5 | 7 | 0.2 | 1 | 150 | 200 | 20 | 1 |
| 17 | MmNi$_{4.9}$Al$_{0.09}$Si$_{0.01}$ | 1.5 | 8 | 7.0 | 1 | 160 | 250 | 20 | 1 |
| 18 | MmNi$_{4.5}$Al$_{0.25}$Si$_{0.25}$ | 1.5 | 7 | 2.8 | 1 | 160 | 260 | 20 | 1 |
| 19 | MmNi$_{4.0}$Al$_{0.5}$Si$_{0.5}$ | 1.5 | 7 | 2.0 | 1 | 160 | 260 | 20 | 1 |
| 20 | MmNi$_{3.0}$Al$_{0.01}$Si$_{1.99}$ | 1.5 | 7 | 0.8 | 1 | 160 | 230 | 20 | 1 |
| 21 | MmNi$_{4.9}$Cu$_{0.09}$Co$_{0.01}$ | 1.5 | 9 | 8.0 | 1 | 160 | 240 | 20 | 1 |
| 22 | MmNi$_{4.5}$Cu$_{0.25}$Co$_{0.25}$ | 1.5 | 7 | 2.5 | 1 | 160 | 240 | 20 | 1 |
| 23 | MmNi$_{3.0}$Cu$_{0.01}$Co$_{1.99}$ | 1.5 | 7 | 4.5 | 1 | 160 | 240 | 20 | 1 |
| 24 | MmNi$_{4.9}$Cu$_{0.09}$Fe$_{0.01}$ | 1.5 | 9 | 8.0 | 1 | 160 | 240 | 20 | 1 |
| 25 | MmNi$_{4.5}$Cu$_{0.25}$Fe$_{0.25}$ | 1.5 | 7 | 1.5 | 1 | 165 | 250 | 20 | 1 |
| 26 | MmNi$_{3.0}$Cu$_{0.01}$Fe$_{1.99}$ | 1.5 | 7 | 1.0 | 1 | 160 | 240 | 20 | 1 |
| 27 | MmNi$_{4.9}$Cu$_{0.09}$Mn$_{0.01}$ | 1.5 | 9 | 8.0 | 1 | 160 | 240 | 20 | 1 |
| 28 | MmNi$_{4.5}$Cu$_{0.25}$Mn$_{0.25}$ | 1.5 | 7 | 1.4 | 1 | 165 | 255 | 20 | 1 |
| 29 | MmNi$_{3.0}$Cu$_{0.01}$Mn$_{1.99}$ | 1.5 | 7 | 0.2 | 1 | 160 | 200 | 20 | 1 |
| 30 | MmNi$_{4.9}$Cu$_{0.09}$Si$_{0.01}$ | 1.5 | 9 | 8.0 | 1 | 160 | 240 | 20 | 1 |
| 31 | MmNi$_{4.5}$Cu$_{0.25}$Si$_{0.25}$ | 1.5 | 7 | 4.0 | 1 | 160 | 255 | 20 | 1 |
| 32 | MmNi$_{3.0}$Cu$_{0.01}$Si$_{1.99}$ | 1.5 | 7 | 0.8 | 1 | 160 | 240 | 20 | 1 |
| 33 | MmNi$_{4.9}$Mn$_{0.09}$Co$_{0.01}$ | 1.5 | 9 | 8.0 | 1 | 160 | 250 | 20 | 1 |
| 34 | MmNi$_{4.5}$Mn$_{0.25}$Co$_{0.25}$ | 1.6 | 7 | 2.0 | 1 | 165 | 250 | 20 | 1 |
| 35 | MmNi$_{4.0}$Mn$_{0.5}$Co$_{0.5}$ | 1.6 | 7 | 1.5 | 1 | 165 | 250 | 20 | 1 |
| 36 | MmNi$_{3.0}$Mn$_{0.01}$Co$_{1.99}$ | 1.5 | 7 | 4.0 | 1 | 165 | 240 | 20 | 1 |
| 37 | MmNi$_{4.9}$Mn$_{0.09}$Fe$_{0.01}$ | 1.5 | 8 | 7.0 | 1 | 165 | 250 | 20 | 1 |

TABLE 1-continued

| Run No. | Hydride of alloy | Amount of hydrogen occluded (% by weight) | Pressure of hydrogen during hydrogen occlusion (atm.) | Dissociation pressure of hydride at 20° C. (atm.) | Number of activation | Speed of hydrogen occlusion (ml/g.min) | Conditions of hydrogen release from hydride | | |
|---|---|---|---|---|---|---|---|---|---|
| | | | | | | | Speed of release (ml/g.min) | Temperature (°C.) | Pressure (atm.) |
| 38 | $MmNi_{4.5}Mn_{0.25}Fe_{0.25}$ | 1.6 | 7 | 1.5 | 1 | 165 | 260 | 20 | 1 |
| 39 | $MmNi_{4.0}Mn_{0.5}Fe_{0.5}$ | 1.6 | 7 | 1.5 | 1 | 165 | 260 | 20 | 1 |
| 40 | $MmNi_{3.0}Mn_{0.01}Fe_{1.99}$ | 1.5 | 7 | 1.0 | 1 | 165 | 260 | 20 | 1 |
| 41 | $MmNi_{4.9}Mn_{0.09}Si_{0.01}$ | 1.5 | 8 | 7.0 | 1 | 160 | 260 | 20 | 1 |
| 42 | $MmNi_{4.5}Mn_{0.25}Si_{0.25}$ | 1.5 | 7 | 4.4 | 1 | 160 | 260 | 20 | 1 |
| 43 | $MmNi_{4.0}Mn_{0.5}Si_{0.5}$ | 1.5 | 7 | 2.0 | 1 | 160 | 260 | 20 | 1 |
| 44 | $MmNi_{3.0}Mn_{0.01}Si_{1.99}$ | 1.5 | 7 | 0.8 | 1 | 160 | 240 | 20 | 1 |

As is evident from Table 1, alloys of this invention occluded hydrogen quickly at room temperature under application of a low hydrogen pressure. The release of hydrogen from the hydride was very easily effected by adjusting the temperature and pressure of the ambience. The dissociation pressures were low.

Comparative Experiment

The alloys proposed before the present invention for use in occlusion of hydrogen were tested for their properties. The results are shown in Table 2.

prepared and activated by use of hydrogen of purity of 99.5%. The activation of these alloys could be completed by one cycle of hydrogen occlusion and release. Then, each activated alloy was made to occlude hydrogen of purity of 99.5% at room temperature (20° C.) under the same hydrogen pressure as shown in Table 1. Thus, the hydrogen was occluded and sealed in the alloy. In this case, the hydrogen occlusion-release properties, such as the amount of hydrogen occluded, the pressure of hydrogen applied, the dissociation pressure exhibited by the formed hydride, the speed of hydrogen

TABLE 2

| | Run No. | Hydride of alloy | Amount of hydrogen occluded (% by weight) | Pressure of hydrogen during hydrogen occlusion (atm.) | Dissociation pressure of hydride at 20° C. (atm.) | Number of activation | Speed of hydrogen occlusion (ml/g.min) | Conditions of hydrogen release from hydride | | |
|---|---|---|---|---|---|---|---|---|---|---|
| | | | | | | | | Speed of release (ml/g.min) | Temperature (°C.) | Pressure (atm.) |
| U.S. Pat. No. 4096639 | 1 | $Mm_{0.8}Ca_{0.2}Ni_5$ | — | 68 | 13.0~15.4 (30° C.) | — | — | — | — | — |
| | 2 | $Mm_{0.5}Ca_{0.5}Ni_5$ | — | 68 | 3.5~12.3 (30° C.) | — | — | — | — | — |
| U.S. Pat. No. 4147536 | 3 | $MmNi_{2.5}Co_{2.5}$ | 1.2 | 50 | 3.3 | 2 | 160 | 150 | 20 | 1 |
| U.S. Pat. No. 4,222,770 | 4 | $MmNi_{4.0}Cu_{1.0}$ | 1.5 | 50 | 11.0 (30° C.) | 1 | 160 | 143 | 20 | 1 |
| | 5 | $MmNi_{4.0}Fe_{1.0}$ | 1.5 | 50 | 6.0 (30° C.) | 1 | 165 | 162 | 20 | 1 |
| | 6 | $MmNi_{4.5}Si_{0.5}$ | 1.5 | 50 | 7.0 (30° C.) | 1 | 185 | 155 | 20 | 1 |
| U.S. Appln. 192809 | 7 | $MmNi_{4.0}Cr_{0.5}Al_{0.5}$ | 1.5 | 50 | 4.3 | 1 | 160 | 240 | 20 | 1 |
| | 8 | $MmNi_{4.0}Cr_{0.5}Co_{0.5}$ | 1.5 | 50 | 4.5 | 1 | 160 | 245 | 20 | 1 |
| | 9 | $MmNi_{4.0}Cr_{0.5}Cu_{0.5}$ | 1.5 | 50 | 3.0 | 2 | 160 | 240 | 20 | 1 |
| | 10 | $MmNi_{4.0}Cr_{0.5}Fe_{0.5}$ | 1.5 | 50 | 5.0 | 2 | 165 | 245 | 20 | 1 |
| | 11 | $MmNi_{4.0}Cr_{0.5}Mn_{0.5}$ | 1.5 | 50 | 4.0 | 1 | 165 | 255 | 20 | 1 |
| | 12 | $MmNi_{4.0}Cr_{0.5}Si_{0.5}$ | 1.5 | 50 | 3.0 | 1 | 160 | 260 | 20 | 1 |
| U.S. Appln. 222351 | 13 | $Mm_{0.5}Ca_{0.5}Ni_{4.5}Al_{0.5}$ | 1.3 | 50 | 2.0 | 1 | 160 | — | — | — |
| | 14 | $Mm_{0.5}Ca_{0.5}Ni_{4.5}Mn_{0.5}$ | 1.1 | 50 | 2.0 | 1 | 160 | — | — | — |

In Table 2, the hydrogen pressures applied were all high. Comparison of the data of Table 1 and those of Table 2 clearly indicates that the alloys of this invention excel the conventional alloys as substances for the occlusion of hydrogen.

EXAMPLE 2

By following the procedure of Example 1, the same alloys of this invention are those shown in Table 1 were occlusion, and the speed of hydrogen release, which were determined of the alloys were substantially the same as those obtained in Example 1. The operation for the release of hydrogen from the hydride and the speed of hydrogen release were respectively as easy and quick as in Example 1. Typical data obtained in this case are shown in the following table.

TABLE 3

| Run No. | Hydride of alloy | Amount of hydrogen occluded (% by weight) | Pressure of hydrogen during hydrogen occlusion (atm.) | Dissociation pressure of hydride at 20° C. (atm.) | Number of activation | Speed of hydrogen occlusion (ml/g.min) | Conditions of hydrogen release from hydride | | |
|---|---|---|---|---|---|---|---|---|---|
| | | | | | | | Speed of release (ml/g.min) | Temperature (°C.) | Pressure (atm.) |
| 1 | $MmNi_{4.5}Al_{0.25}Co_{0.25}$ | 1.6 | 7 | 2.0 | 1 | 165 | 250 | 20 | 1 |
| 2 | $MmNi_{4.5}Al_{0.25}Cu_{0.25}$ | 1.6 | 7 | 1.5 | 1 | 165 | 240 | 20 | 1 |

TABLE 3-continued

| Run No. | Hydride of alloy | Amount of hydrogen occluded (% by weight) | Pressure of hydrogen during hydrogen occlusion (atm.) | Dissociation pressure of hydride at 20° C. (atm.) | Number of activation | Speed of hydrogen occlusion (ml/g.min) | Conditions of hydrogen release from hydride ||| 
|---|---|---|---|---|---|---|---|---|---|
| | | | | | | | Speed of release (ml/g.min) | Temperature (°C.) | Pressure (atm.) |
| 3 | MmNi$_{4.5}$Al$_{0.25}$Fe$_{0.25}$ | 1.6 | 7 | 1.5 | 1 | 165 | 260 | 20 | 1 |
| 4 | MmNi$_{4.5}$Al$_{0.25}$Mn$_{0.25}$ | 1.6 | 7 | 1.7 | 1 | 165 | 260 | 20 | 1 |
| 5 | MmNi$_{4.5}$Cu$_{0.25}$Mn$_{0.25}$ | 1.5 | 7 | 1.4 | 1 | 165 | 255 | 20 | 1 |
| 6 | MmNi$_{4.5}$Mn$_{0.25}$Co$_{0.25}$ | 1.6 | 7 | 2.0 | 1 | 165 | 250 | 20 | 1 |
| 7 | MmNi$_{4.5}$Mn$_{0.25}$Fe$_{0.25}$ | 1.6 | 7 | 1.5 | 1 | 165 | 260 | 20 | 1 |

What is claimed is:

1. A quaternary alloy for the occlusion of hydrogen under low pressure, exhibiting low dissociation pressure of hydride and high speed of hydrogen release, the alloy having a composition represented by the following general formula:

$$MmNi_{5-x}A_{x-y}B_y$$

wherein, Mm stands for misch metal, A for one element selected from the group consisting of Al, Cu, and Mn, B for one element selected from the group consisting of Al, Co, Cu, Fe, Mn, and Si, x for a numerical value in the range of from 0.1 to 2, y for a numerical value in the range of from 0.01 to 1.99, providing that both A and B do not represent the same element and the numerical value of x is greater than that of y.

2. The alloy according to claim 1, wherein A is an element selected from the group consisting of Al and Mn, B is an element selected from the group consisting of Al, Co, Fe, and Mn, x is a numerical value falling within the range of from 0.5 to 1.0, and y is a numerical value falling within the range of from 0.1 to 0.9.

3. The alloy according to claim 1, wherein the misch metal is mainly composed of 25 to 35% by weight of lanthanum, 40 to 50% by weight of cerium, 1 to 15% by weight of praseodymium, 4 to 15% by weight of neodymium, 1 to 7% by weight of samarium+gadolinium, 0.1 to 5% by weight of iron, 0.1 to 1% by weight of silicon, 0.1 to 2% by weight of magnesium, and 0.1 to 1% by weight of aluminum.

* * * * *